United States Patent
Kabutan et al.

(10) Patent No.: US 11,833,695 B2
(45) Date of Patent: Dec. 5, 2023

(54) DIAGNOSIS OF STATE OF DEVICE

(71) Applicant: KABUSHIKI KAISHA YASKAWA DENKI, Kitakyushu (JP)

(72) Inventors: Ryo Kabutan, Fukuoka (JP); Takuro Matsumoto, Fukuoka (JP); Ryohei Suzuki, Tokyo (JP)

( * ) Notice: Subject to any disclaimer, the term of this patent is extended or adjusted under 35 U.S.C. 154(b) by 64 days.

(21) Appl. No.: 17/525,960

(22) Filed: Nov. 15, 2021

(65) Prior Publication Data

US 2022/0152830 A1 May 19, 2022

(30) Foreign Application Priority Data

Nov. 16, 2020 (JP) .................. 2020-190341

(51) Int. Cl.
*G06F 11/30* (2006.01)
*B25J 9/16* (2006.01)
*B23K 37/02* (2006.01)
*G01M 99/00* (2011.01)

(52) U.S. Cl.
CPC ......... *B25J 9/1674* (2013.01); *B23K 37/0229* (2013.01); *B25J 9/163* (2013.01); *G01M 99/005* (2013.01)

(58) Field of Classification Search
CPC .................................................... B25J 9/1674
See application file for complete search history.

(56) References Cited

U.S. PATENT DOCUMENTS

| 2014/0291300 | A1 | 10/2014 | Amagata |
| 2015/0336201 | A1 | 11/2015 | Amagata |
| 2016/0129525 | A1 | 5/2016 | Aoki |

FOREIGN PATENT DOCUMENTS

| EP | 2011598 | | 1/2009 |
| EP | 2011598 | * | 7/2009 |
| JP | 2007-029994 | | 2/2007 |
| JP | 2010-000528 | | 1/2010 |
| JP | 5638102 | | 12/2014 |

OTHER PUBLICATIONS

Jung Wonho et al.: "Modified Recurrence Plot for Robust Condition Monitoring of Electrode Tips in a Resistance Spot Welding System", Applied Sciences, vol. 10, No. 16, Aug. 24, 2020, p. 5860, XP055902237, ISSN: 2076-3417, DOI: 10.3390/app10175860 (Year: 2020).*

Jung Wonho et al, "Modified Recurrence Plot for Robust Condition Monitoring of Electrode Tips in a Resistance Spot Welding System", Applied Sciences, vol. 10, No. 17, Aug. 24, 2020, P5860.

Extended Search Report in corresponding European Application No. 20206697.1, dated Mar. 29, 2022.

* cited by examiner

*Primary Examiner* — Phuong Huynh
(74) *Attorney, Agent, or Firm* — SOEI PATENT & LAW FIRM

(57) ABSTRACT

An example diagnosis system determines a state of a target device that includes a work apparatus. The diagnosis system includes circuitry that is configured to acquire first data generated in response to operating the work apparatus at a first pressure, configured to acquire second data generated in response to operating the work apparatus at a second pressure, configured to calculate a feature quantity indicating a relation between the first data and the second data, and configured to determine the state of the target device based on the feature quantity.

20 Claims, 9 Drawing Sheets

DIAGNOSIS OF STATE OF DEVICE

CROSS-REFERENCE TO RELATED APPLICATIONS

This application claims the benefit of priority from Japanese Patent Application No. 2020-190341, filed on Nov. 16, 2020, the entire contents of which are incorporated herein by reference.

BACKGROUND

Japanese Patent Application No. 5638102 B describes a spot welding system having a spot welding gun for welding a workpiece while applying pressure to the workpiece between a movable electrode chip driven by a servomotor and a fixed electrode chip facing the movable electrode chip.

SUMMARY

A diagnosis system according to an aspect of the present disclosure determines a state of a target device including a work apparatus. The diagnosis system includes circuitry configured to acquire first data generated in response to operating the work apparatus at a first pressure, to acquire second data generated in response to operating the work apparatus at a second pressure, to calculate a feature quantity indicating a relation between the first data and the second data, and to determine the state of the target device based on the feature quantity.

A diagnosis method according to an aspect of the present disclosure includes acquiring first data generated in response to operating a work apparatus of a target device at a first pressure, acquiring second data generated in response to operating the work apparatus at a second pressure, calculating a feature quantity indicating a relation between the first data and the second data, and determining a state of the target device based on the feature quantity.

Anon-transitory computer-readable storage medium according to an aspect of the present disclosure stores processor-executable instructions to acquire first data generated in response to operating a work apparatus of a target device at a first pressure, to acquire second data generated in response to operating the work apparatus at a second pressure, to calculate a feature quantity indicating a relation between the first data and the second data, and to determine a state of the target device based on the feature quantity.

DETAILED DESCRIPTION

In the following description, with reference to the drawings, the same reference numbers are assigned to the same components or to similar components having the same function, and overlapping description is omitted.

Robot System

Figure 1:
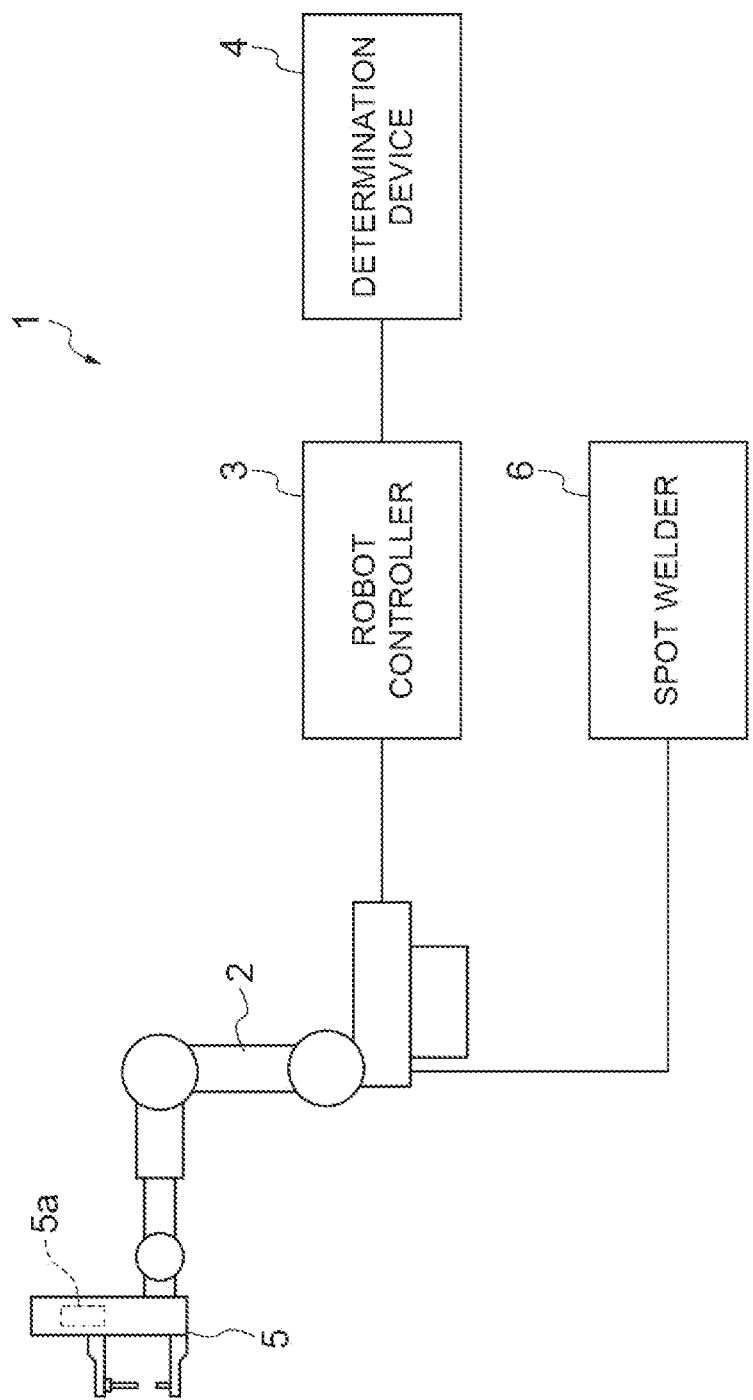
FIG. 1 is a diagram showing a configuration of an example robot system.

With reference to FIG. 1, an example diagnosis system (also referred to herein as "determination system") according to the present disclosure may be applied to a determination device 4 of a robot system 1. The robot system 1 may automate various operations such as machining and assembly by causing a robot to execute a motion instructed by an operator.

FIG. 1 is a diagram showing an example of a configuration of the robot system 1. According to some examples, the robot system 1 comprises one or more robots 2, one or more robot controllers 3 corresponding to the one or more robots 2, and the determination device 4. FIG. 1 shows a configuration in which one robot 2 is connected to one robot controller 3. In other examples, a plurality of the robot 2 may be connected to one robot controller 3.

In some examples, the robot 2 is a vertically articulated robot of multi-axis serial link type, and is configured to execute various processes with a work apparatus 5 held at the tip portion thereof. The robot 2 is able to freely change the position and posture of the tip portion within a predetermined range. The robot 2 may be a 6-axis vertically articulated robot or a 7-axis vertically articulated robot in which one redundant axis is added to 6 axes. In some examples, a plurality of robots 2 are arranged such that any one of the robots 2 is able to execute the same processing on the same workpiece arranged at the same position.

The robot 2 is an example of a device including the work apparatus 5 and a motor 5a for activating the work apparatus 5. Such devices may also be referred to as a target device in the present disclosure. The work apparatus is an apparatus that processes a workpiece, for example, an equipment that gives some physical change to the workpiece. The work apparatus 5 may be a variety of devices such as a welding gun, a press machine, and the like. The motor 5a may be a component of the work apparatus 5 or exist outside the work apparatus 5. In some examples, the work apparatus 5 is a welding gun mounted to the robot 2 as an end effector. The welding gun performs spot welding on the workpiece by a power supplied from a spot welder 6.

The robot controller 3 is a device that controls the robot 2 according to a previously generated operation program. The operation program includes data for controlling the robot 2. Under the control of the robot controller 3, the robot 2 executes a series of processes. In the present disclosure, this series of processes may also be referred to as a job. The process of the minimum unit constituting the job is called a task. Thus, the job contains one or more tasks. The robot 2 may perform various tasks such as "take a component", "place a component", "fit a component (to a workpiece)", "take a waiting posture", and the like. The operation program indicates, for example, an execution order of tasks and paths indicating trajectories of the robot 2. The trajectory of the robot 2 refers to a path of movement of the robot 2 or of a component of the robot 2. For example, the trajectory of the robot 2 may be a trajectory of the tip portion. In some examples, the robot controller 3 calculates a target joint angle value (a target angle value of each joint of the robot 2) for matching the position and posture of the tip portion with the target value indicated by the operation program, and controls the robot 2 according to the target angle value.

The determination device 4 is a computer that determines a state of the robot 2, which is the target device. In some examples, the determination device 4 determines the state of the robot 2 based on data obtained from the robot 2, the work apparatus 5, or the motor 5a. The determination device 4 outputs a command for activating the work apparatus 5, to the motor 5a. The command is an instruction to control the work apparatus 5. The determination device 4 collects a response from the motor 5a, the work apparatus 5, or the robot 2 activated according to the command. The response is an output corresponding to the command and, for example, indicates a motion or a state of an object actuated in accordance with the command. The object may be, for example, at least one of the work apparatus 5, the motor 5a, and the robot 2. In the present disclosure, data indicating a set of collected responses may also be referred to as response data. The determination device 4 then determines the state of the robot 2 based on the response data.

In the present disclosure, the state of the device may refer to a situation or condition of the device itself or of a component of the device and, for example, may indicate whether the device or the component is normal or abnormal. The state of the device itself may correspond to, for example, the state of the robot 2. The state of the component is, for example, the state of the work apparatus 5 or the motor 5a. In a case in which the work apparatus 5 is the welding gun, examples of abnormalities of the welding gun include abrasion of an electrode (an electrode chip), axial misalignment between a pair of electrodes, deterioration of mechanical characteristics such as backlash, and abnormality of a circuitry element such as a converter IC. The cause of the abnormality of the device or component may be aging degradation or defective products.

Determination Device

Figure 2:
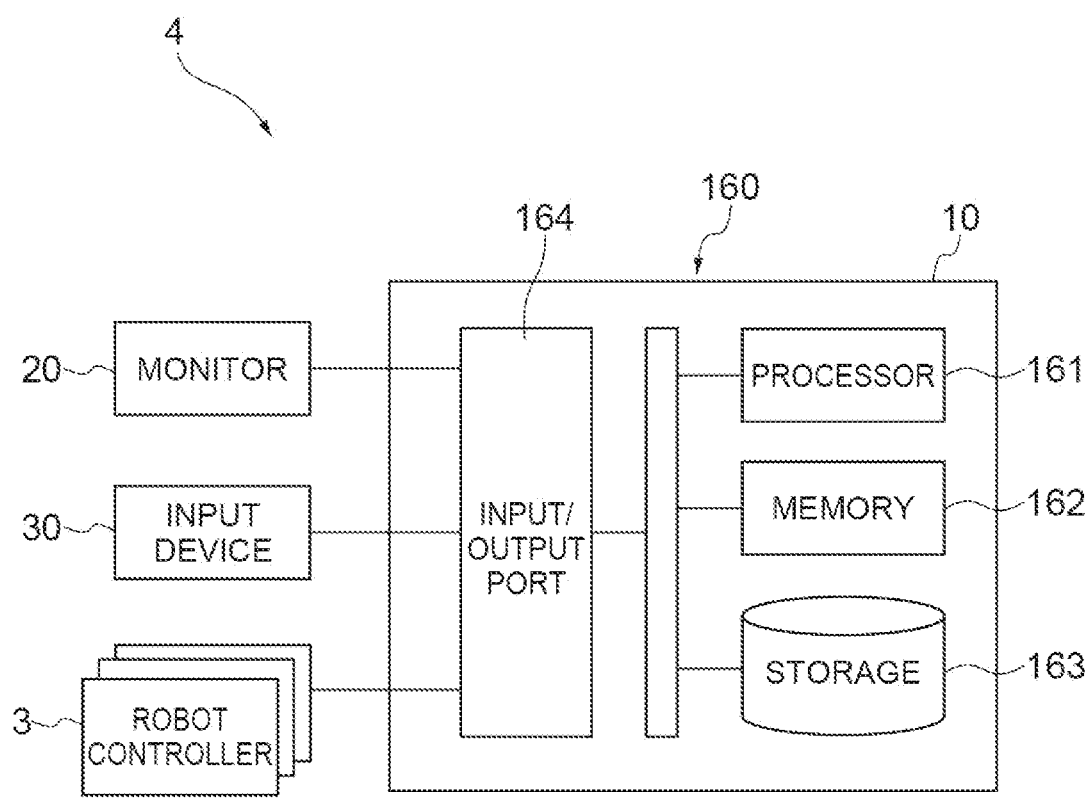
FIG. 2 is a diagram showing a hardware configuration of an example determination device.

FIG. 2 is a diagram showing an example of a hardware configuration of the determination device 4. The determination device 4 includes a body 10, a monitor 20, and an input device 30.

The body 10 may include at least one computer. The body 10 accommodates circuitry 160, and the circuitry 160 may include at least one of a processor 161, a memory 162, a storage 163, and an input/output port 164. The storage 163 stores a program, in the form of processor-executable instructions, for example, to configure each functional module of the body 10. The storage 163 is a computer-readable recording medium such as a hard disk, a nonvolatile semiconductor memory, a magnetic disk, an optical disk, or the like. The memory 162 temporarily stores the program loaded from the storage 163, calculation results by the processor 161, and the like. The processor 161 provides each functional module by executing the program in cooperation with the memory 162. The input/output port 164 inputs and outputs electrical signals between the monitor 20, the input device 30, and the robot controller 3 in response to commands from the processor 161.

Monitor 20 is a device for displaying information output from the body 10. The monitor 20 may include any display device capable of graphic display, and examples thereof include a liquid crystal panel. The input device 30 is a device for inputting information into the body 10. The input device 30 may be any one or more device capable of inputting desired information, and may include for example, a keypad and a mouse.

The monitor 20 and the input device 30 may be integrated as a touch panel (e.g., touch screen). For example, similarly to a tablet computer, the body 10, the monitor 20, and the input device 30 may be integrated into a single device.

Figure 3:
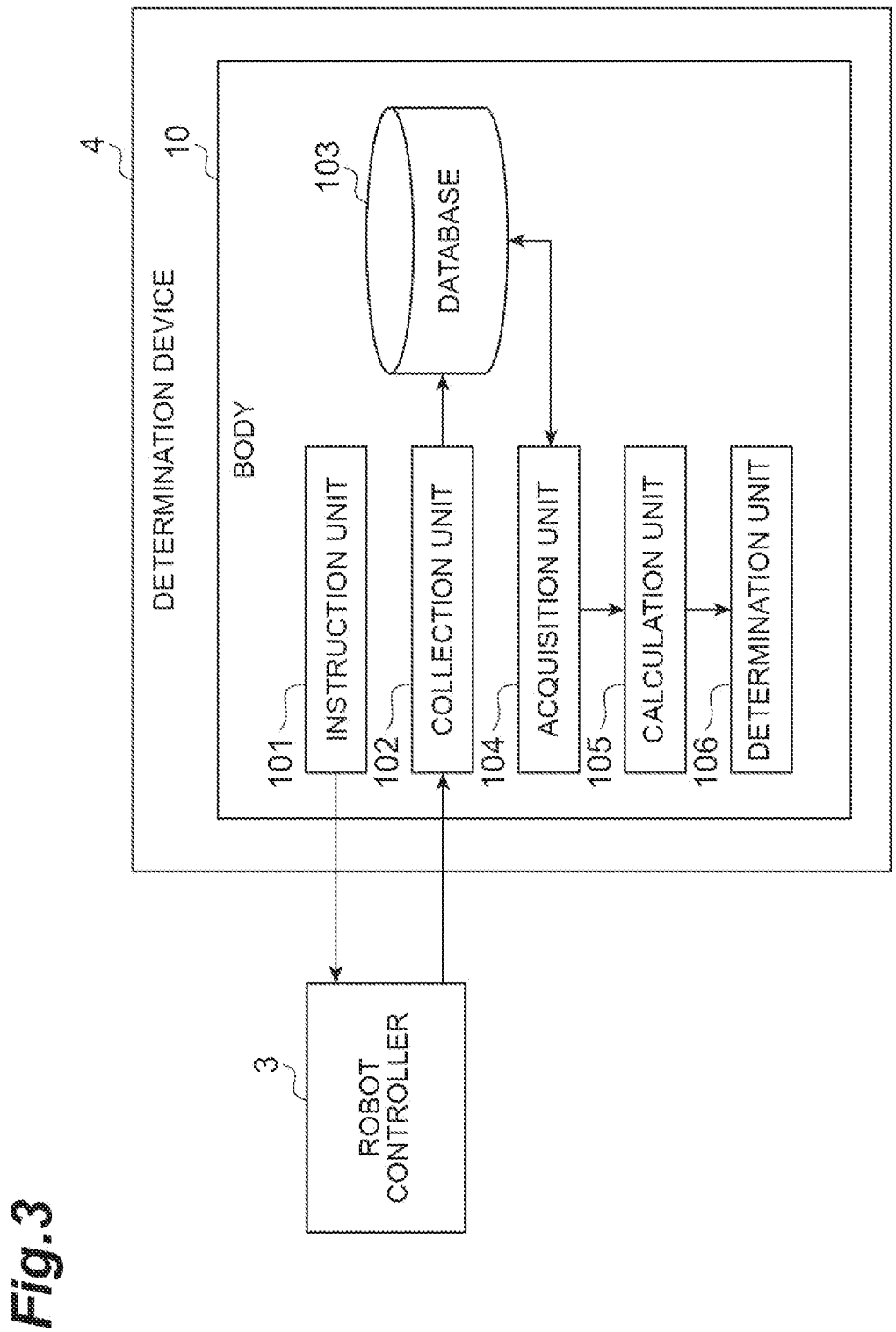
FIG. 3 is a diagram showing a functional configuration of an example determination device.

FIG. 3 shows an example of a functional configuration of the determination device 4. In some examples, the determination device 4 comprises an instruction unit 101, a collection unit 102, a database 103, an acquisition unit 104, a calculation unit 105, and a determination unit 106 as functional modules. The instruction unit 101 is a functional module that outputs the command for activating the work apparatus 5 to the motor 5a. The term "to output the command to the motor" means outputting the command such that the command is finally transmitted to the motor. The collection unit 102 is a functional module that collects a response to the command. The database 103 is a functional module that stores the response obtained by the collection unit 102 as response data. The database 103 may be implemented on a computer separate from the determination device 4 or on a computer system separate from the robot system 1, so that the determination device 4 is able to access to the database 103. The acquisition unit 104 is a functional module that acquires the response data from the database 103. The calculation unit 105 is a functional module that calculates a feature quantity based on the response data. In the present disclosure, the feature quantity refers to a numerical value representing a feature of motion of the target device and, for example, is a numerical value representing a feature of motion of at least one of the robot 2, the work apparatus 5, and the motor 5a. The determination unit 106 is a functional module that determines the state of the robot 2 based on the feature quantity.

In the example of FIG. 3, the instruction unit 101 transmits the command to the motor 5a via the robot controller 3, and the collection unit 102 collects the response via the robot controller 3. For example, the robot controller 3 controls the motor 5a based on the command, and the motor 5a activates the work apparatus 5 under the control. The robot controller 3 then receives the response to the command from at least one of the robot 2, the work apparatus 5, and the motor 5a, and transmits the response to the determination device 4. The determination device 4 may transmit the command and collect the response by other means. For example, the instruction unit 101 may transmit the command directly to the motor 5a. The collection unit 102 may collect the response directly from at least one of the robot 2, the work apparatus 5, and the motor 5a.

Figure 4:
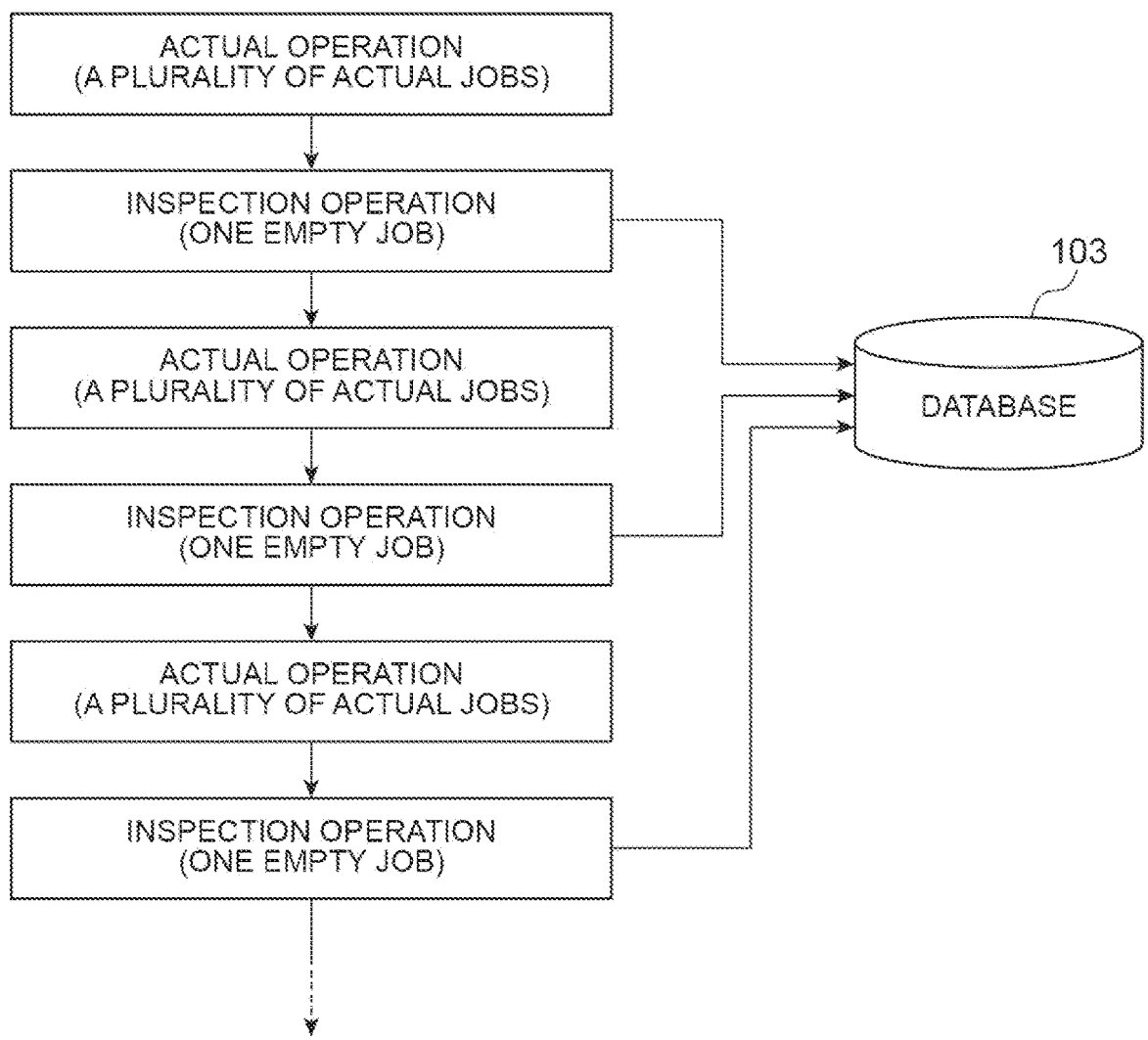
FIG. 4 is a diagram showing an example configuration for collecting response data.

FIG. 4 is a diagram showing an example of the collection of the response data for one robot 2. In this example, the instruction unit 101 repeats a combination of an actual operation (also referred to herein as "work operation") and an inspection operation, and the collection unit 102 stores in the database 103 a response record indicating the response in each inspection operation (i.e., each inspection time point). As a result, the database 103 stores a plurality of response records corresponding to a plurality of inspection time points as the response data indicating a history of the responses over time.

In the present disclosure, the actual operation or work operation refers to an operation of processing one or more workpieces by a target device. In association with the actual operation, a job corresponding to processes for one workpiece is called an actual job (also referred to herein as "work job"). For example, in the actual operation, the robot 2 performs one or more actual jobs for spot welding for the workpiece using a welding gun. In this actual job, the welding gun is energized by a power supplied by the spot welder 6, and the welding gun perform the spot welding by the heating due to the current.

In this disclosure, the inspection operation refers to an operation of activating the target device to obtain the response record. The inspection operation is an operation for activating the target device without processing the workpiece. In relation to the inspection operation, performing a motion corresponding to the actual job without processing the workpiece is called an empty job. In a case in which the work apparatus 5 executes the empty job, no workpiece is given to the work apparatus 5. By the inspection operation (empty job), a response record is obtained to reflect a state in which the disturbance factor (external factor) related to the workpiece is eliminated or significantly reduced. The response record therefore indicates the state of the target device itself or the state of the component itself of the target device.

In some examples, the instruction unit 101 causes the robot 2 to execute a plurality of actual jobs in one actual operation, and then causes the robot 2 to execute one empty job in one inspection operation. In a case in which the work apparatus 5 is a welding gun, the instruction unit 101 actuates the robot 2 in a state in which the welding gun is not energized, in each inspection operation. For example, the instruction unit 101 actuates the robot 2 in a state in which the welding gun is not energized and the electrodes of the welding gun are in contact without being pressed against each other. The collection unit 102 stores the response record obtained from the empty job in the database 103. As shown in FIG. 4, a plurality of response records (for example, a large number of response records) for one robot 2 are accumulated in the database 103 by repeating multiple times a processing procedure in which the determination device 4 performs one inspection operation after one actual operation.

Diagnosis Method

Figure 5:
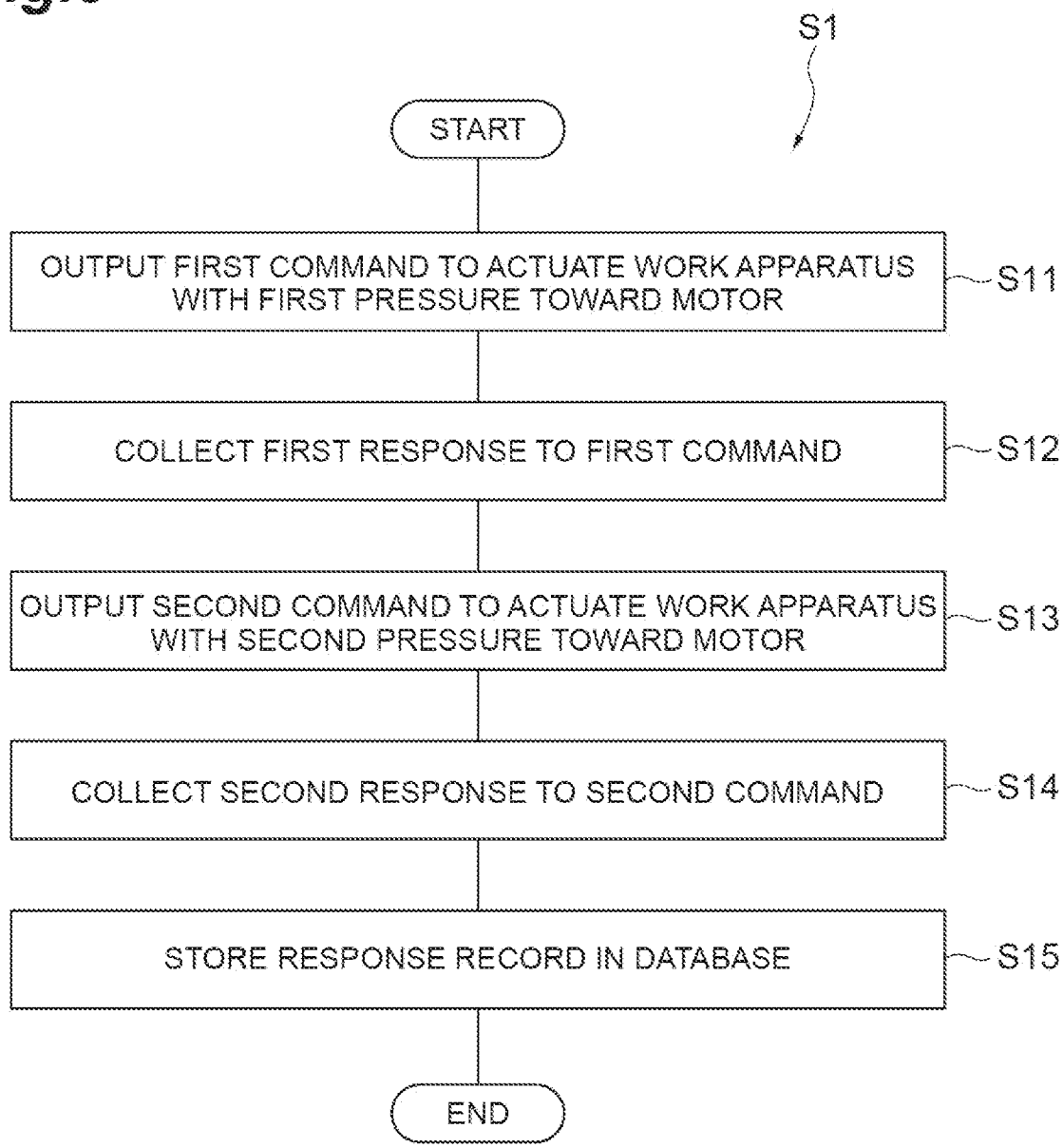
FIG. 5 is a flowchart showing an example process of collecting response data.

As examples of the diagnosis method (also referred to herein as "determination method") according to the present disclosure, the collection of response data executed by the determination device 4 will be described with reference to FIG. 5. FIG. 5 is a flowchart showing a procedure of the collection as a processing flow S1. For example, the determination device 4 executes the processing flow S1. In some examples, the determination device 4 executes the processing flow S1 in each inspection operation for each robot 2. Thus, the robot 2 and the work apparatus 5 do not process the workpiece in the processing flow S1.

In step S11, the instruction unit 101 outputs a first command toward the motor 5a to actuate the work apparatus 5 with a first pressure. The first command is, for example, a torque command. In some examples, the first pressure is a pressure required to process the workpiece with the work apparatus 5. For example, the first pressure is a pressure applied to a pair of electrodes on the welding gun. In some examples, the instruction unit 101 transmits the first command to the robot controller 3, and the robot controller 3 controls the motor 5a based on the first command. The motor 5a actuates the welding gun with the first pressure according to the control, and the first pressure is applied between the pair of electrodes. In this process, the instruction unit 101 outputs the first command without energizing the welding gun. For example, the instruction unit 101 outputs the first command in the state in which the welding gun is not energized and the electrodes of the welding gun are in contact without being pressed against each other.

In step S12, the collection unit 102 collects a first response to the first command. The first response is information obtained in response to outputting the first command toward the motor 5a, and is typically collected when the work apparatus 5 and the motor 5a are in a steady state. The first response may be information obtained from at least one of the robot 2, the work apparatus 5, and the motor 5a. In some examples, the first response indicates a position of the motor 5a moving along a gun axis of the welding gun, and this position may reflect a state of the welding gun. The gun axis is represented by a straight line extending between the tips of a pair of electrodes.

In step S13, the instruction unit 101 outputs a second command to the motor 5a to actuate the work apparatus 5 with a second pressure. The second command is, for example, a torque command. Like the first pressure, the second pressure is also a pressure required to process the workpiece with the work apparatus 5 and, for example, a pressure applied between the pair of electrodes of a welding gun. The second pressure is different from the first pressure and, for example, higher than the first pressure. In some examples, the instruction unit 101 transmits the second command to the robot controller 3, and the robot controller 3 controls the motor 5a based on the second command. The motor 5a operates the welding gun with the second pressure according to the control, and the second pressure is applied between the pair of electrodes. In this process, the instruction unit 101 outputs the second command without energizing the welding gun. For example, the instruction unit 101 outputs the second command in the state in which the welding gun is not energized and the electrodes of the welding gun are in contact without being pressed against each other.

In step S14, the collection unit 102 collects a second response to the second command. The second response is information obtained in response to outputting the second command to the motor 5a and, is typically collected when the work apparatus 5 and the motor 5a are in a steady state. Like the first response, the second response may be information obtained from at least one of the robot 2, the work apparatus 5, and the motor 5a. For example, the second response indicates a position of the motor 5a along the gun axis of the welding gun.

In step S15, the collection unit 102 stores a response record indicating the first response and the second response in the database 103. In some examples, the collection unit 102 sets a record identifier to uniquely identify a pair of the first response and second response, generates a response record indicating a combination of the record identifier, the first response, and the second response, and stores the response record in the database 103. A data item set as the identifier may be, for example, at least one of the following identifiers: sequence number, inspection date and time, and identifier of the robot 2. In some examples, the response record may include a data item indicating a determination result based on the response indicated by the record. At the time when the response record is stored in step S15, the determination result is null.

Figure 6:
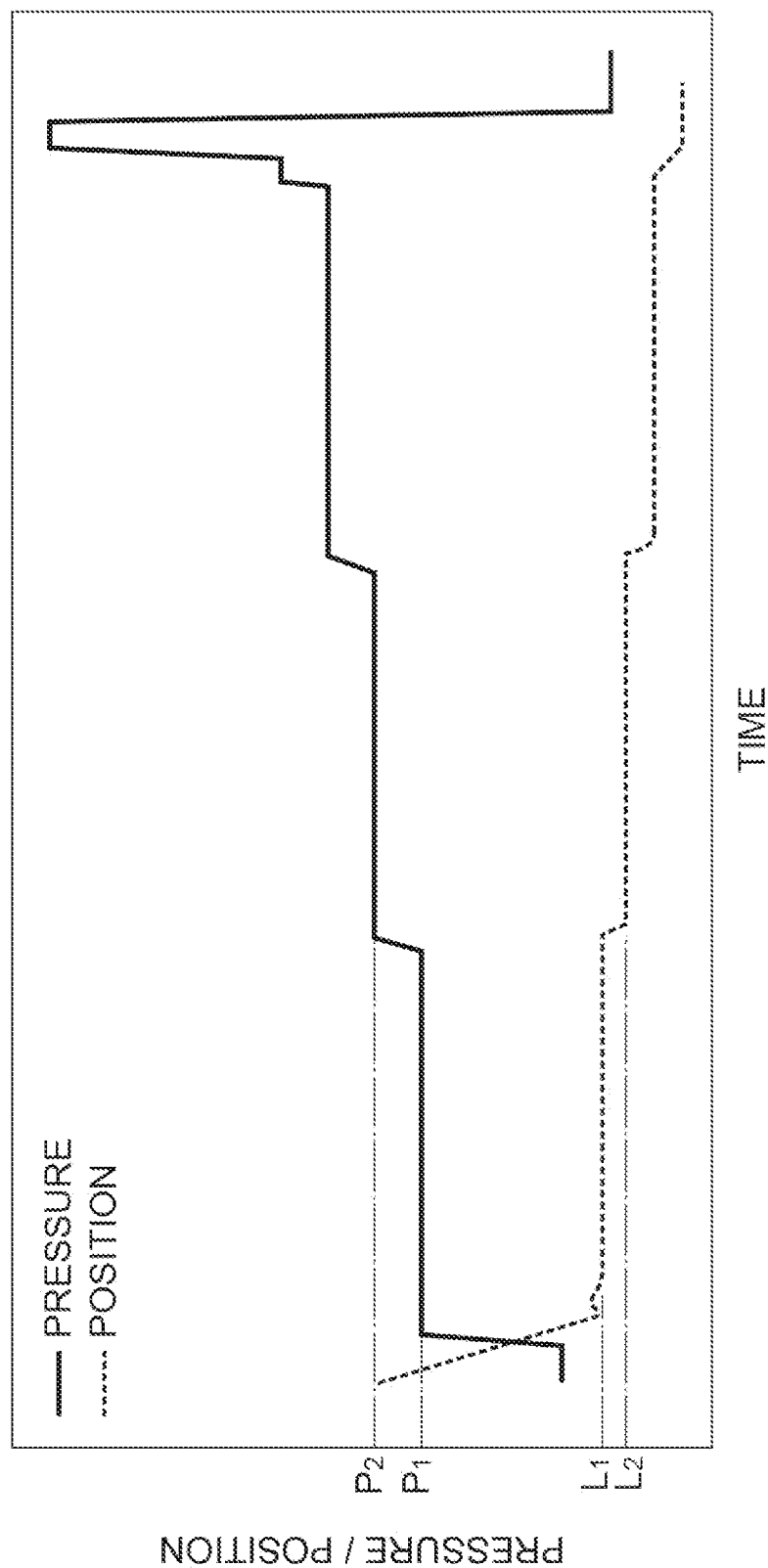
FIG. 6 is a graph showing an example of command and response signals over time.

FIG. 6 is a graph showing an example of command and response in one inspection operation (i.e., in one execution of the processing flow S1). The horizontal axis of the graph indicates elapsed time, and the vertical axis represents the pressure applied to the welding gun (the work apparatus 5) and the position of the motor 5a moving along the gun axis of the welding gun. In this example, the instruction unit 101 outputs to the motor 5a the first command to actuate the welding gun with first pressure $P_1$. The collection unit 102 collects position $L_1$ of the motor 5a in the steady state as the first response to the first command. The instruction unit 101 then outputs to the motor 5a the second command to actuate the welding gun with second pressure $P_2$. The collection unit 102 collects position $L_2$ of the motor 5a in the steady state as the second response to the second command. As shown in this example, the instruction unit 101 may output the second command to the motor 5a such that the pressure of the work apparatus 5 is raised from the first pressure to the second pressure without lowering the pressure of the work apparatus 5. By controlling pressure in this way, both the pressure and position change stepwise. In some examples, the first pressure $P_1$ is 3000N and the second pressure $P_2$ is 4000N. The instruction unit 101 may output the first command and second command and collect the first response and second response, without changing the posture of the target device. FIG. 6 shows a case in which the pressure increases further from the second pressure $P_2$ and the position of the motor 5a changes further in response to the change of pressure. However, such a further pressure increase does not have to be carried out, depending on examples.

One execution of the processing flow S1 corresponds to one empty job. Each empty job is performed after the actual operation (or work operation). As can be seen from FIGS. 4 and 5, the instruction unit 101 repeats multiple times, the combination of the actual operation of processing one or more workpieces by the robot 2 and the processing of outputting the first command and the second command toward the motor 5a after the actual operation. As a result of this iteration, the database 103 stores a plurality of response records for one robot 2.

Figure 7:
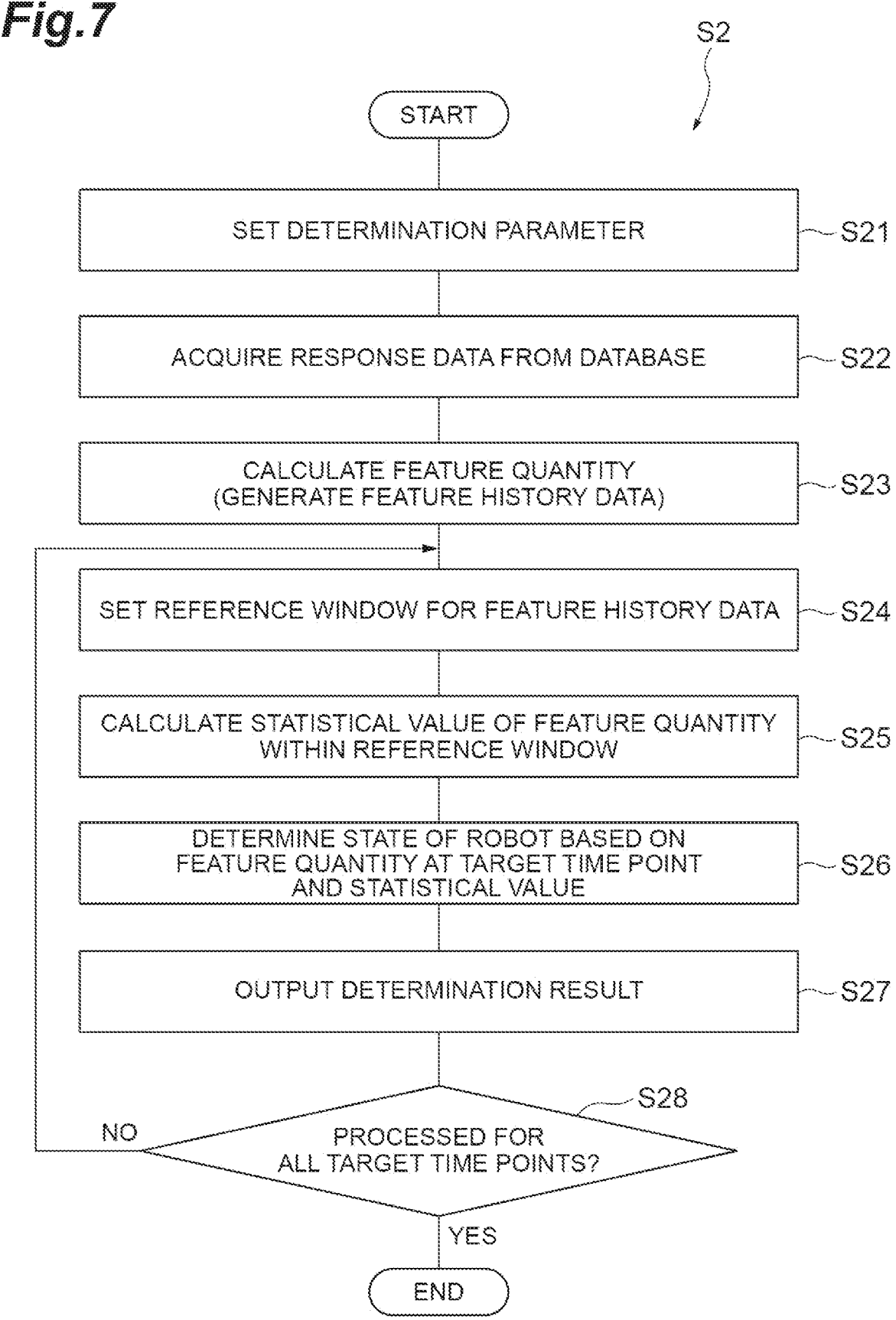
FIG. 7 is a flowchart showing an example process of determining a state of a target device.

As examples of the diagnosis method (or determination method) according to the present disclosure, the determination of the state of the target device executed by the determination device 4 will be described with reference to FIG. 7. FIG. 7 is a flowchart showing a procedure of the determination as processing flow S2. That is, the determination device 4 executes the processing flow S2. In some examples, the determination device 4 executes the processing flow S2 for each the robot 2. For example, the determination device 4 executes the processing flow S2 for the robot 2 after sufficient or necessary response data for the determination with respect to the robot 2 has been accumulated in the database 103.

In step S21, the acquisition unit 104 sets one or more determination parameters. The determination parameter is data used to determine the state of the target device such as the robot 2. For example, the determination parameters may include a threshold used for the determination or a size of a reference window described later. The acquisition unit 104 may set the determination parameter based on an input by a user, or may use the determination parameter stored in the storage 163 in advance.

In step S22, the acquisition unit 104 acquires the response data corresponding to one robot 2 from the database 103. The acquisition unit 104 may read, for the robot 2, all the response data or a part of the response data corresponding to a time width. In any case, the response data includes first data indicating the first response and second data indicating the second response. That is, the acquisition unit 104 acquires the first data obtained in response to outputting toward the motor 5a the first command for activating the work apparatus 5 at the first pressure, and the second data obtained in response to outputting toward the motor 5a the second command for activating the work apparatus 5 at the second pressure. The response data shows the history of the response along the time series. Therefore, the acquisition unit 104 acquires time series data of the work apparatus 5 acting at the first pressure as the first data, and acquires time series data of the work apparatus 5 acting at the second pressure as the second data. As described above with reference to FIGS. 4 and 5, the first data and second data are obtained by repeating multiple times the combination of actual operation and inspection operation.

In step S23, the calculation unit 105 calculates the feature quantity indicating the relation between the first data and the second data, and accordingly indicating the relation between the first response and the second response, based on the response data. For each of the plurality of inspection operations (i.e., the plurality of inspection time points), the calculation unit 105 calculates at least one of a difference between the first response and the second response (i.e., a difference between the first data and the second data) and a ratio between the first response and the second response (i.e., a ratio between the first data and the second data) as a feature quantity. The calculation unit 105 generates feature history data showing changes over time in the feature quantity. With respect to the calculation of the ratio, the calculation unit 105 may calculate a ratio of the second data to the first data or a ratio of the first data to the second data.

In step S24, the determination unit 106 sets a reference window for the feature history data. In the present disclosure, the reference window refers to a range set for the feature history data to determine the state of the target device at a time point. The size of the reference window is defined by, for example, the determination parameter. In the present disclosure, a time point at which the state of the target device is determined may also be referred to as a target time point. The determination unit 106 sets the reference window containing multiple time points before the target time point to the feature history data. The reference window does not include the target time point.

Figure 8:
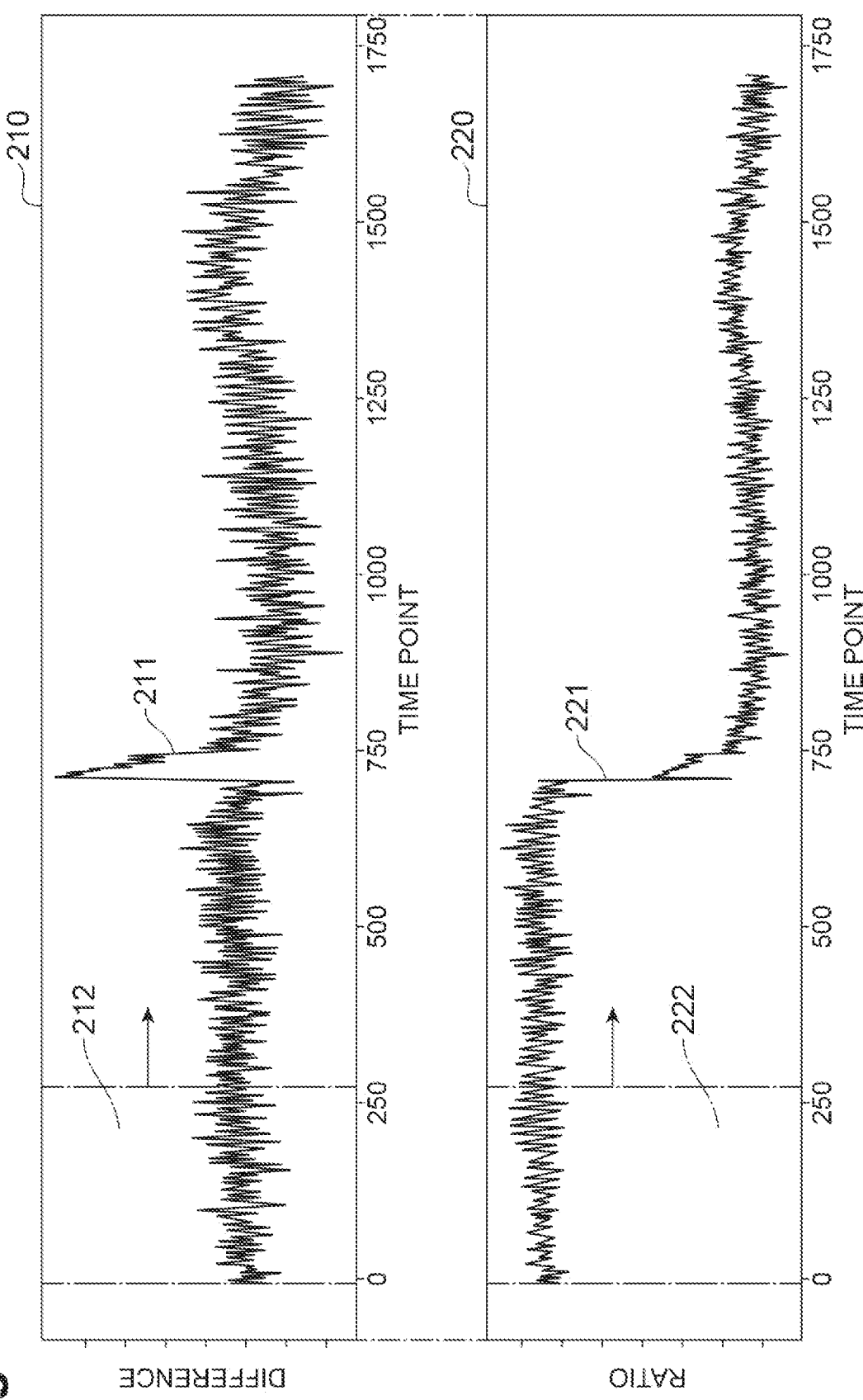
FIG. 8 is a diagram showing an example of feature history data over time.

FIG. 8 shows an example of the feature history data and the reference window. In this example, a graph 210 indicates feature history data 211 indicating the changes over time in the difference between first data and second data. A graph 220 is feature history data 221 indicating the changes over time in the ratio between the first data and the second data. In this example, the determination unit 106 sets a reference window 212 to the feature history data 211 and a reference window 222 to the feature history data 221. The determination unit 106 sets the position and width of the reference windows 212 and 222 to be the same. That is, in case of setting the reference window for both the difference and ratio, the determination unit 106 matches the position and width of both the reference windows. In the example of FIG. 8, since the trend of the ratio has changed after the elapsed time has passed 700, it is highly likely that an abnormality has occurred from that time point.

Returning to FIG. 7, in step S25, the determination unit 106 calculates a statistical value of the feature quantity within the reference window. As an example, in a case in which two corresponding feature quantities have been calculated, such as the combination of the difference and ratio, the determination unit 106 calculates an average (a mean vector) and a covariance (a covariance matrix) for the two feature quantities as the statistical values. The average and covariance represent a two-dimensional multivariate normal distribution. Alternatively, the determination unit 106 may calculate the statistical value such as the average, the variance, and the like, for each of the difference and ratio.

In step S26, the determination unit 106 determines the state of the robot 2 (the target device) at the target time point based on the feature quantity at the target time point and the calculated statistical value. In some examples, the determination unit 106 compares the feature quantity at the target time point to a given threshold set for the statistical value to determine the state of the robot 2. The threshold is defined by, for example, the determination parameter. For example, the determination unit 106 calculates a Mahalanobis distance between the feature quantity at the target time point and the distribution of the feature quantity within the reference window, based on the feature quantity at the target time point and the statistical value, and determines the state of the robot 2 based on the Mahalanobis distance. The determination unit 106 determines that the robot 2 is normal if the Mahalanobis distance is equal to or less than the threshold, and determines that the robot 2 is abnormal if the Mahalanobis distance exceeds the threshold. The determination unit 106 may perform a determination based on a Mahalanobis distance of two variables (two dimensions) corresponding to the combination of the difference and ratio, or perform a determination based on a univariate (one dimension) Mahalanobis distance corresponding to each of the difference and ratio. In case of performing the determination based on each of the difference and ratio, the determination unit 106 may determine that the robot 2 is normal if both the Mahalanobis distances are less than or equal to the threshold, and determine that the robot 2 is abnormal if at least one Mahalanobis distance exceeds the threshold.

Figure 9:
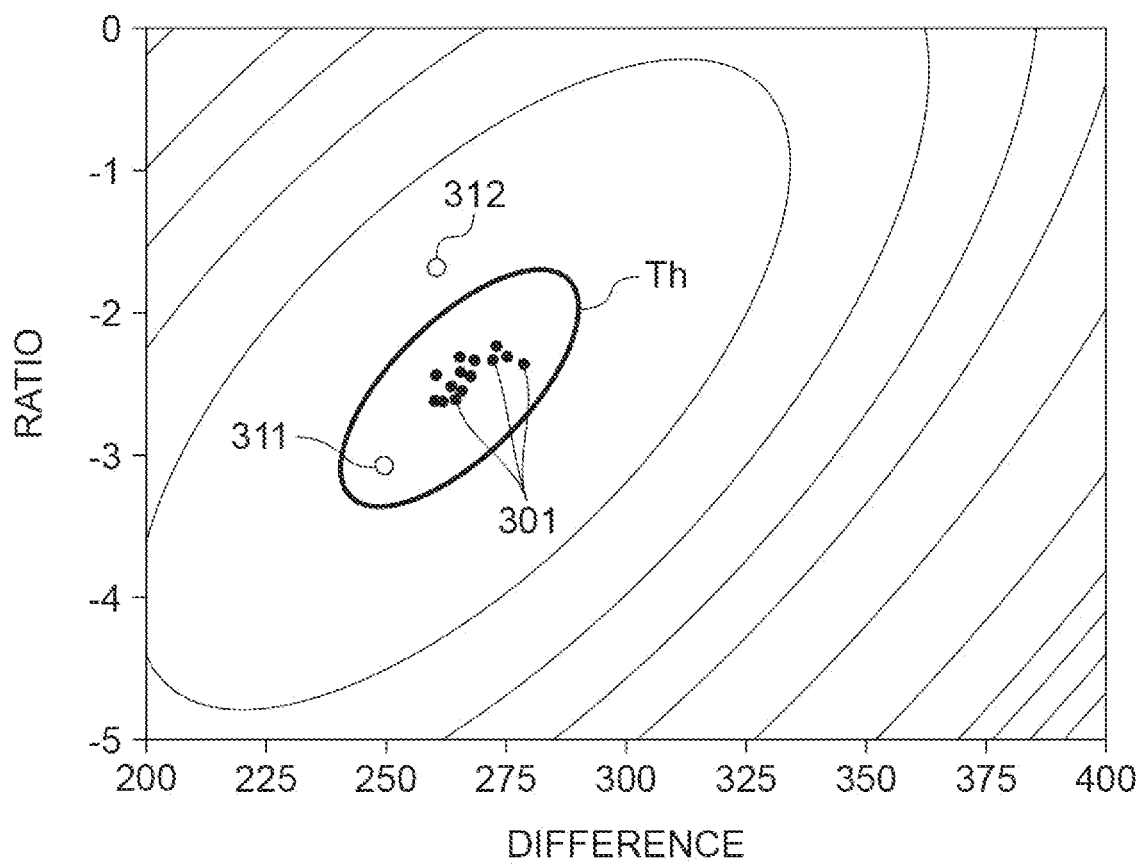
FIG. 9 is a graph showing example feature quantities in a multivariate normal distribution.

FIG. 9 is a diagram showing an example of determining the state of the robot 2, and represents a multivariate normal distribution represented by the average and covariances for the combinations of the difference and ratio by contours. Points 301 represent individual feature quantities within the reference window, and a frame Th represents the thresholds with respect to the Mahalanobis distance. In this example, the determination unit 106 calculates the Mahalanobis distance, which is the distance between the feature quantity at the target time point and the distribution of the feature quantity within the reference window, and compares the Mahalanobis distance with the threshold (the frame Th). The threshold for Mahalanobis distance may be defined by a multiple of a standard deviation $\sigma$ such as $2\sigma$, $3\sigma$, or $4\sigma$. The standard deviation $\sigma$ indicates a variation on the assumption that the distribution of data observed in a plurality of inspection operations (empty jobs) is a normal distribution. The determination unit 106 determines that the robot 2 is normal if the calculated Mahalanobis distance is equal to or less than the threshold, and determines that the robot 2 is abnormal if that calculated Mahalanobis distance exceeds the threshold. In a case in which the feature quantity at the target time point is expressed by a point 311, the determination unit 106 determines that the robot 2 is normal because the Mahalanobis distance is less than or equal to the threshold. In a case in which the feature quantity at the target time point is expressed by a point 312, the determination unit 106 determines that the robot 2 is abnormal because the Mahalanobis distance exceeds the threshold. FIG. 9 shows an example of determining the state of the target device based on both the difference and ratio.

Referring back to FIG. 7, in step S27, the determination unit 106 outputs the determination result. For example, the determination unit 106 may store the determination result in a recording medium such as the storage 163. Alternatively, the determination unit 106 may display the determination result on the monitor 20 in the form of text, a moving image or a still image by computer graphics (CG). In some examples, the determination unit 106 writes the determination result to the response record corresponding to the target time point. For example, the determination unit 106 may write a flag indicating whether the robot 2 is normal or abnormal to the response record.

As indicated by step S28, the determination device 4 repeats the step S24 through S27 until all target time points are processed. In the step S24, the determination unit 106 moves the position of the reference window by a predetermined amount along the time flow to reset the reference window. For example, the determination unit 106 shifts the reference window by one time point. In FIG. 8, arrows extending from the right-side ends of the reference windows 212 and 222 indicate a direction in which the reference window is moved. In the step S25 the determination unit 106 calculates the statistical value of the feature quantity within the reset reference window. In the step S26, the determination unit 106 determines the state of the robot 2 at a next time point based on the feature quantity at that next target time point and the calculated statistical value. In the step S27, the determination unit 106 outputs the determination result. That is, the determination unit 106 may determine the state of the robot 2 at each of the plurality of target time points while moving the reference window along the time axis.

In a case in which the determination is repeated while simply moving the reference window along the time axis, the reference window may include the feature quantity at the target time point at which the robot 2 is determined to be abnormal. In some examples, in a case in which the determination unit 106 sets the reference window to determine the state of the robot 2 at a second target time point after a plurality of first target time points, determination unit 106 sets the reference window such that the first target time point at which the robot 2 is determined to be abnormal is excluded from the reference window.

Examples of setting such a reference window will be described. In an example, it is assumed that the feature history data indicates the feature quantities corresponding to a hundred time points $T_1$ to $T_{100}$, and that the reference window has a width of ten time points. On the assumption that the robot 2 is normal at the time points $T_1$ to $T_{10}$, the determination unit 106 sets the reference window in the range of the time points $T_1$ to $T_{10}$ to determine the state of the robot 2 at the time point $T_{11}$. In case of determining that the robot 2 is normal at the time point $T_{11}$, the determination unit 106 shifts the reference window to the range of the time points $T_2$ to $T_{11}$ to determine the state of the robot 2 at the time point $T_{12}$. In this example, it is assumed that the robot 2 is determined to be normal up to the time point $T_{50}$ and is determined to be abnormal for the first time in the time point $T_{51}$. In this case, the determination unit 106 sets the reference window to the range of the time points $T_{41}$ to $T_{50}$, not to the range of the time points $T_{42}$ to $T_{51}$, in order to determine the state of the robot 2 at the time point $T_{52}$. Accordingly, when the reference window is set to determine the state of the robot 2 at the second target time point $T_{52}$, the reference window is set such that the first target time point $T_{51}$ is excluded from the reference window. In a case in which the robot 2 is determined to be normal at the time point $T_{52}$, the determination unit 106 sets the reference window to the range of the time points $T_{42}$ to $T_{50}$ and $T_{52}$ in order to determine the state of the robot 2 at the time point $T_{53}$. In a case in which the robot 2 is also determined to be normal at the time point $T_{53}$, the determination unit 106 sets the reference window to the range of the time points $T_{43}$ to $T_{50}$, $T_{52}$, and $T_{53}$ in order to determine the state of the robot 2 at the time point $T_{54}$. In a case in which the robot 2 is determined to be abnormal at the time point $T_{54}$, the determination unit 106 sets the reference window to the range of the time points $T_{43}$ to $T_{50}$, $T_{52}$, and $T_{53}$ in order to determine the state of the robot 2 at a time point $T_{55}$. As described above, the determination unit 106 may set the reference window while excluding the first target time point at which the robot 2 is determined to be abnormal, such that the size of the reference window, that is, the number of feature quantities included in the reference window is maintained at a constant value.

Program

Each functional module of the determination device 4 is realized by loading a diagnosis program (also referred to herein as "determination program") onto the processor 161 or the memory 162 and causing the processor 161 to execute the program. The diagnosis program includes code (e.g., processor-executable instructions) for realizing each functional module of the determination device 4. The processor 161 operates the input/output port 164 according to the diagnosis program, and reads and writes data in the memory 162 or the storage 163. Each functional module of the determination device 4 is realized by such processing.

The diagnosis program may be provided after being fixedly recorded on a non-transitory recording medium such as a CD-ROM, a DVD-ROM, or a semiconductor memory. In other examples, the diagnosis program may be provided via the communication network as a data signal superimposed on the carrier.

As described above, a determination system or diagnosis system according to some examples of the present disclosure, determines a state of a target device including a work apparatus and a motor for operating the work apparatus. The determination system includes circuitry configured to: acquire first data generated in response to outputting a first command that causes the motor to actuate the work apparatus at a first pressure, acquire second data generated in response to outputting a second command that causes the motor to operate the work apparatus at a second pressure, calculate a feature quantity indicating a relation between the first data and the second data, and determine the state of the target device based on the feature quantity.

A determination method or diagnosis method according to some examples of the present disclosure includes: acquiring first data generated in response to outputting a first command that causes a motor of a target device to operate a work apparatus of the target device at a first pressure, acquiring second data generated in response to outputting a second command that causes the motor to operate the work apparatus at a second pressure, calculating a feature quantity indicating a relation between the first data and the second data, and determining a state of the target device based on the feature quantity.

Anon-transitory computer-readable storage medium according to some examples of the present disclosure stores processor-executable instructions to: acquire first data generated in response to outputting a first command that causes the motor of a target device to operate a work apparatus of the target device at a first pressure, acquire second data generated in response to outputting a second command that causes the motor to operate the work apparatus at a second pressure, calculate a feature quantity indicating a relation between the first data and the second data, and determine a state of the target device based on the feature quantity.

According to such examples, the state of the device is determined based on the relation between the two kinds of data obtained by actuating the work apparatus at each of the two pressures. Since the disturbance factor is eliminated or significantly reduced by considering the relation between the two kinds of data, the state of the device can be more suitably determined. In a case in which the state of the device is determined by a single kind of data, i.e., by an absolute value, it may be more difficult to accurately determine the state of the device because the absolute value may vary greatly depending on a disturbance factor (e.g., the environment around the device) at the measurement time point. Since the feature quantity indicating the relation between the first data and the second data is a relative value, the influence of the disturbance factor is substantially removed. Therefore, by using the feature quantity, the state of the device can be determined in a more stable and/or accurate manner. In some examples, automatic determination is possible without relying on knowledge and experience of an operator, and early detection of device abnormalities and identification of defective individual components can be performed more efficiently.

In the determination system (or diagnosis system) according to some examples, the feature quantity may include a difference between the first data and the second data, and a ratio between the first data and the second data, so that the state of the device is determined based on both the difference and the ratio. The state of the device can thus be more reliably determined by considering two types of feature quantities, the difference and the ratio for example, so as to more reliably detect any abnormality (abnormal state) of the device.

In some examples, the second pressure associated with the second data acquired may be greater than the first pressure associated with the first data acquired.

In some examples, first time series data of the work apparatus operating at the first pressure may be acquired as the first data, and second time series data of the work apparatus operating at the second pressure may be acquired as the second data. The circuitry may be further configured to generate feature history data based on the first time series data and the second time series data, in which the feature history data indicates a change over time in the feature quantity, to set a reference window including a plurality of time points before a target time point in the feature history data, and to calculate a statistical value of feature quantities associated with the plurality of time points within the reference window. In this case, the state of the target device may be determined based on the feature quantity at the target time point and the statistical value. The first data and second data vary over time, and the feature history data varies accordingly. By calculating the statistical value of the feature quantity at a predetermined time width in the past and considering the statistical value and the feature quantity at the target time point, the state of the device at the target time point can be determined more accurately even when the data varies.

In some examples, the statistical value calculated may include an average and a covariance of the feature quantities within the reference window. The state of the device can be determined more accurately by considering the average and covariance.

In some examples, the circuitry may be further configured to calculate a Mahalanobis distance between the feature quantity at the target time point and a distribution of the feature quantities within the reference window, based on the feature quantity at the target time point and the statistical value, and to determine the state of the device based on the Mahalanobis distance.

In some examples, the state of the target device may be determined to be normal in a case in which the Mahalanobis distance is equal to or less than a given threshold and to be abnormal in a case in which the Mahalanobis distance exceeds the threshold.

In some examples, the circuitry may be further configured to set the threshold based on a standard deviation of normal distributions of the first data and the second data.

In some examples, the circuitry may be further configured to determine the state of the target device at a plurality of target time points by shifting the reference window along a time axis of the feature history data for each of the plurality of target time points, in which the statistical value is calculated for each of the plurality of target time points, by excluding any feature quantity in the corresponding reference window, that is associated with an abnormal state of the target device. For example, the circuitry may be configured to: determine the state of the target device at each of a plurality of first target time points while moving the reference window along a time axis; and set the reference window to determine the state of the device at a second target time point after the first target time points, such that any first target time point at which the device is determined to be abnormal, is excluded from the reference window. Since the reference window is set by the data determined as normal without using the data determined as abnormal, the statistical value obtained from the reference window also continues to indicate the normal motion of the device. Therefore, the state of the device can be determined more accurately along the time axis.

In some examples, the circuitry may be further configured to output the first command and the second command toward the motor. This configuration enables the determination of the state of the device and the instruction for the determination to be more comprehensively executed.

In some examples, the circuitry may be configured to output the first command and the second command toward the motor without changing a posture of the device.

In some examples, the circuitry may be configured to output the second command toward the motor so as to increase a pressure at which the work apparatus is operated, from the first pressure to the second pressure without lowering the pressure below the first pressure. Since such pressure control avoid an occurrence in which the application of the first pressure is repeated in the change from the first pressure to the second pressure, the feature quantity indicating the relation between the first data and the second data can be more accurately calculated.

In some examples, the work apparatus may be a welding gun, and the circuitry may be configured to output the first command and the second command toward the motor in a state in which the welding gun is not energized. This process substantially eliminates disturbance factors associated with the welding gun, such as nuggets on the weld portion of the workpiece, so that the state of the device can be more suitably determined, for example, in a more stable or accurate manner.

In some examples, the circuitry may be configured to output the first command and the second command toward the motor in a state in which the welding gun is not energized and in which the electrodes of the welding gun are brought into contact with each other without applying a contact pressure to the electrodes. In the operation of the welding gun, the process of not energizing the welding gun and of bringing the electrodes of the welding gun into contact with each other without applying the pressure is performed to find a change in the distance between the pair of electrodes of the welding gun (in other words, to measure an abrasion loss of the electrodes). In this case, the first data and second data are collected utilizing the opportunity to perform such necessary processing on the welding gun, thereby increasing the efficiency of the welding gun work (e.g., inspection).

In some examples, each of the first pressure and the second pressure may be a contact pressure applied to press the electrodes of the welding gun against each other.

In some examples, the device may be a robot, and the welding gun may be mounted to the robot as an end effector. The welding gun mounted on the robot may perform various postures corresponding to the motion of the robot. In this case, the state of the device can be more suitably determined by substantially eliminating disturbance factors caused by the posture change.

In some examples, the circuitry may be further configured to: repeat, a plurality of times, a sequence of operations that includes performing an actual operation to cause the target device to process one or more workpieces, and subsequently performing an inspection operation that includes outputting the first command and the second command toward the motor, in which the first data and the second data generated are stored in a storage, so that the first data and the second data may be acquired from the storage. For example, the circuitry may be configured to: repeat, a plurality of times, a combination of an actual operation (or work operation) for processing one or more workpieces by the device, and an inspection operation for outputting the first command and the second command toward the motor after the actual operation, and acquire the first data and the second data obtained by the repetitions. By acquiring the first data and second data during the actual operation, changes in the state of the device due to continued use of the device can be more suitably acquired as the first data and second data.

In some examples, the circuitry may be further configured to: cause the target device to execute a plurality of the actual jobs corresponding to the one or more workpieces in the actual operation; and cause the target device to execute a motion corresponding to one of the actual jobs without processing the workpiece in the inspection operation.

Additional Examples

It is to be understood that not all aspects, advantages and features described herein may necessarily be achieved by, or included in, any one particular example. Indeed, having described and illustrated various examples herein, it should be apparent that other examples may be modified in arrangement and detail is omitted.

For example, the functional configuration of the diagnosis system (or determination system) is not limited to the above examples. The diagnosis method (or determination method) according to the present disclosure may be executed using another functional configuration different from the above example.

The hardware configuration of the diagnosis system is not limited to examples in which each functional module is realized by executing a program. In some examples, at least a part of the functional modules described above may be configured by logic circuitry dedicated to carry out the function, or may be configured by an application specific integrated circuit (ASIC) in which the logic circuitry is integrated.

A procedure of the method executed by at least one processor is not limited to the above examples. For example, some of the above-described steps or processing may be omitted, or executed in a different order. Further, two or more of the above-described steps may be combined, or a part of the steps may be modified or deleted.

Alternatively, other steps may be performed in addition to the above steps.

In a case where the magnitude relation between two numerical values is compared in a computer system or a computer, either of the two criteria "greater than or equal to" and "greater than" may be used, and either of the two criteria "less than or equal to" and "less than" may be used.

We claim all modifications and variations coining within the spirit and scope of the subject matter claimed herein.

Regarding the above examples, the following appendices are provided by way of further illustration.

(Appendix 1) A determination system for determining a state of a device including a work apparatus and a motor for actuating the work apparatus, the determination system comprising:
  an acquisition unit configured to acquire first data obtained in response to outputting a first command to actuate the work apparatus at a first pressure toward the motor, and second data obtained in response to outputting a second command to actuate the work apparatus at a second pressure toward the motor;
  a calculation unit configured to calculate a feature quantity indicating a relation between the first data and the second data; and
  a determination unit configured to determine the state of the device based on the feature quantity.

(Appendix 2) The determination system according to appendix 1,
  wherein the calculation unit is further configured to calculate a difference between the first data and the second data and a ratio between the first data and the second data as the feature quantity; and
  wherein the determination unit is further configured to determine the state of the device based on both the difference and the ratio.

(Appendix 3) The determination system according to appendix 1 or 2,
  wherein the acquisition unit is further configured to:
    acquire time series data of the work apparatus operating at the first pressure as the first data; and
    acquire time series data of the work apparatus operating at the second pressure as the second data,
  wherein the calculation unit is further configured to generate feature history data indicating a change over time in the feature quantity, and
  wherein the determination unit is further configured to:
    in order to determine the state of the device at a target time point, set a reference window including a plurality of time points before the target time point to the feature history data;
    calculate a statistical value of the feature quantities within the reference window; and
    determine the state of the device based on the feature quantity at the target time point and the statistical value.

(Appendix 4) The determination system according to appendix 3, wherein the determination unit is further configured to calculate an average and a covariance of the feature quantities within the reference window as the statistical value.

(Appendix 5) The determination system according to appendix 3 or 4, wherein the determination unit is further configured to:
  determine the state of the device at each of a plurality of first target time points while moving the reference window along a time axis; and
  in a case in which the reference window is set to determine the state of the device at a second target time point after the first target time points, set the reference window such that the first target time point at which the device is determined to be abnormal is excluded from the reference window.

(Appendix 6) The determination system according to any one of appendices 1 to 5, further comprising an instruction unit configured to output the first command and the second command toward the motor.

(Appendix 7) The determination system according to appendix 6, wherein the instruction unit is further configured to output the second command toward the motor so as to raise a pressure of the work apparatus from the first pressure to the second pressure without lowering the pressure of the work apparatus from the first pressure.

(Appendix 8) The determination system according to appendix 6 or 7,
  wherein the work apparatus is a welding gun; and
  wherein the instruction unit is further configured to output the first command and the second command toward the motor in a state in which the welding gun is not energized.

(Appendix 9) The determination system according to appendix 8, wherein the instruction unit is further configured to output the first command and the second command toward the motor in a state in which the welding gun is not energized and in which the electrodes of the welding gun are in contact without being pressured against each other.

(Appendix 10) The determination system according to appendix 8 or 9,
  wherein the device is a robot; and
  wherein the welding gun is mounted to the robot as an end effector.

(Appendix 11) The determination system according to any one of appendices 6 to 10,
  wherein the instruction unit is further configured to repeat, a plurality of times, a combination of an actual operation for processing one or more workpieces by the device and an inspection operation for outputting the first command and the second command toward the motor after the actual operation, and
  wherein the acquisition unit is further configured to acquire the first data and the second data obtained by the repetitions.

(Appendix 12) A determination method executed by a determination system for determining a state of a device comprising a work apparatus and a motor for actuating the work apparatus, the method comprising:
  acquiring first data obtained in response to outputting a first command to actuate the work apparatus at a first pressure toward the motor, and second data obtained in response to outputting a second command to actuate the work apparatus at a second pressure toward the motor;
  calculating a feature quantity indicating a relation between the first data and the second data; and
  determining the state of the device based on the feature quantity.

(Appendix 13) A determination program for causing a computer to function as a determination system for determining a state of a device comprising a work apparatus and a motor for actuating the work apparatus, the program causing the computer to execute:
  acquire first data obtained in response to outputting a first command to actuate the work apparatus at a first pressure toward the motor, and second data obtained in response to outputting a second command to actuate the work apparatus at a second pressure toward the motor;
  calculate a feature quantity indicating a relation between the first data and the second data; and determine the state of the device based on the feature quantity.

What is claimed is:

1. A diagnosis system comprising circuitry configured to:
output, to a motor of a target device, a first command that causes the motor to operate a work apparatus at a non-zero first pressure;
acquire first data generated in response to operating the work apparatus of the target device at the first pressure;
output, to the motor, a second command that causes the motor to increase a pressure at which the work apparatus is operated, from the first pressure to a second pressure without lowering the pressure below the first pressure, and to operate the work apparatus at the second pressure;
acquire second data generated in response to operating the work apparatus at the second pressure;
calculate a feature quantity indicating a relation between the first data and the second data; and
determine a state of the target device based on the feature quantity.

2. The diagnosis system according to claim 1,
wherein the feature quantity includes a difference between the first data and the second data, and a ratio between the first data and the second data, and
wherein the state of the target device is determined based on both the difference and the ratio.

3. The diagnosis system according to claim 1, wherein the second pressure associated with the second data acquired is greater than 3000N.

4. The diagnosis system according to claim 1,
wherein first time series data of the work apparatus operating at the first pressure is acquired as the first data,
wherein second time series data of the work apparatus operating at the second pressure is acquired as the second data,
wherein the circuitry is further configured to:
generate feature history data based on the first time series data and the second time series data, wherein the feature history data indicates a change of the feature quantity over time;
set a reference window including a plurality of time points before a target time point in the feature history data; and
calculate a statistical value of feature quantities associated with the plurality of time points within the reference window, and
wherein the state of the target device is determined based on the feature quantity at the target time point and based on the statistical value.

5. The diagnosis system according to claim 4, wherein the statistical value calculated includes an average and a covariance of the feature quantities within the reference window.

6. The diagnosis system according to claim 4,
wherein the circuitry is further configured to calculate a Mahalanobis distance between the feature quantity at the target time point and a distribution of the feature quantities within the reference window, based on the feature quantity at the target time point and based on the statistical value, and
wherein the state of the target device is determined to be normal when the Mahalanobis distance is equal to or less than a given threshold, and to be abnormal when the Mahalanobis distance exceeds the threshold.

7. The diagnosis system according to claim 6, wherein the circuitry is further configured to set the threshold based on a standard deviation of normal distributions of the first data and the second data.

8. The diagnosis system according to claim 4,
wherein the circuitry is further configured to determine the state of the target device at a plurality of target time points by shifting the reference window along a time axis of the feature history data for each of the plurality of target time points, and
wherein for each of the plurality of target time points, the statistical value is calculated by excluding any feature quantity in the corresponding reference window, that is associated with an abnormal state of the target device.

9. The diagnosis system according to claim 1,
wherein the first data indicates a position of the motor in response to outputting the first command that causes the motor to operate the work apparatus at the first pressure, and
wherein the second data indicates a position of the motor in response to outputting the second command that causes the motor to operate the work apparatus at the second pressure.

10. The diagnosis system according to claim 1, wherein the first command and the second command are output toward the motor without changing a posture of the target device.

11. The diagnosis system according to claim 1,
wherein the work apparatus is a welding gun, and
wherein the first command and the second command are output toward the motor in a state in which the welding gun is not energized.

12. The diagnosis system according to claim 11, wherein in the state in which the first command and the second command are output toward the motor, a pair of electrodes of the welding gun are brought into contact with each other without applying a contact pressure to the electrodes.

13. The diagnosis system according to claim 11, wherein each of the first pressure and the second pressure is a non-zero contact pressure applied to press a pair of electrodes of the welding gun against each other.

14. The diagnosis system according to claim 11,
wherein the target device is a robot, and
wherein the welding gun is mounted to the robot as an end effector.

15. The diagnosis system according to claim 1, wherein the circuitry is further configured to:
repeat, a plurality of times, a sequence of operations comprising:
performing an actual operation to cause the target device to process one or more workpieces; and
after performing the actual operation, performing an inspection operation that includes outputting the first command and the second command toward the motor, wherein the first data generated in response to the first command and the second data generated in response to the second command are stored in a storage, and
wherein the first data and the second data are acquired from the storage.

16. The diagnosis system according to claim 15, wherein the circuitry is further configured to:
cause the target device to execute a plurality of the actual jobs corresponding to the one or more workpieces in the actual operation; and
cause the target device to execute a motion corresponding to one of the plurality of actual jobs without processing the workpiece in the inspection operation.

17. A diagnosis method comprising:
- outputting, to a motor of a target device, a first command that causes the motor to operate a work apparatus at a non-zero first pressure;
- acquiring first data generated in response to operating the work apparatus of the target device at the first pressure;
- outputting, to the motor, a second command that causes the motor to increase a pressure at which the work apparatus is operated, from the first pressure to a second pressure without lowering the pressure below the first pressure, and to operate the work apparatus at the second pressure;
- acquiring second data generated in response to operating the work apparatus at the second pressure;
- calculating a feature quantity indicating a relation between the first data and the second data; and
- determining a state of the target device based on the feature quantity.

18. A non-transitory computer-readable storage medium storing processor-executable instructions to:
- output, to a motor of a target device, a first command that causes the motor to operate a work apparatus at a non-zero first pressure;
- acquire first data generated in response to operating the work apparatus of the target device at the first pressure;
- output, to the motor, a second command that causes the motor to increase a pressure at which the work apparatus is operated, from the first pressure to a second pressure without lowering the pressure below the first pressure, and to operate the work apparatus at the second pressure;
- acquire second data generated in response to operating the work apparatus at the second pressure;
- calculate a feature quantity indicating a relation between the first data and the second data; and
- determine a state of the target device based on the feature quantity.

19. The non-transitory computer-readable storage medium according to claim 18,
- wherein the first data indicates a position of the motor in response to outputting the first command that causes the motor to operate the work apparatus at the first pressure,
- wherein the second data indicates a position of the motor in response to outputting the second command that causes the motor to operate the work apparatus at the second pressure, and
- wherein the first command and the second command are output toward the motor without changing a posture of the target device.

20. The diagnosis method according to claim 17,
- wherein the first data indicates a position of the motor in response to outputting the first command that causes the motor to operate the work apparatus at the first pressure,
- wherein the second data indicates a position of the motor in response to outputting the second command that causes the motor to operate the work apparatus at the second pressure, and
- wherein the first command and the second command are output toward the motor without changing a posture of the target device.

* * * * *